Figure 1:
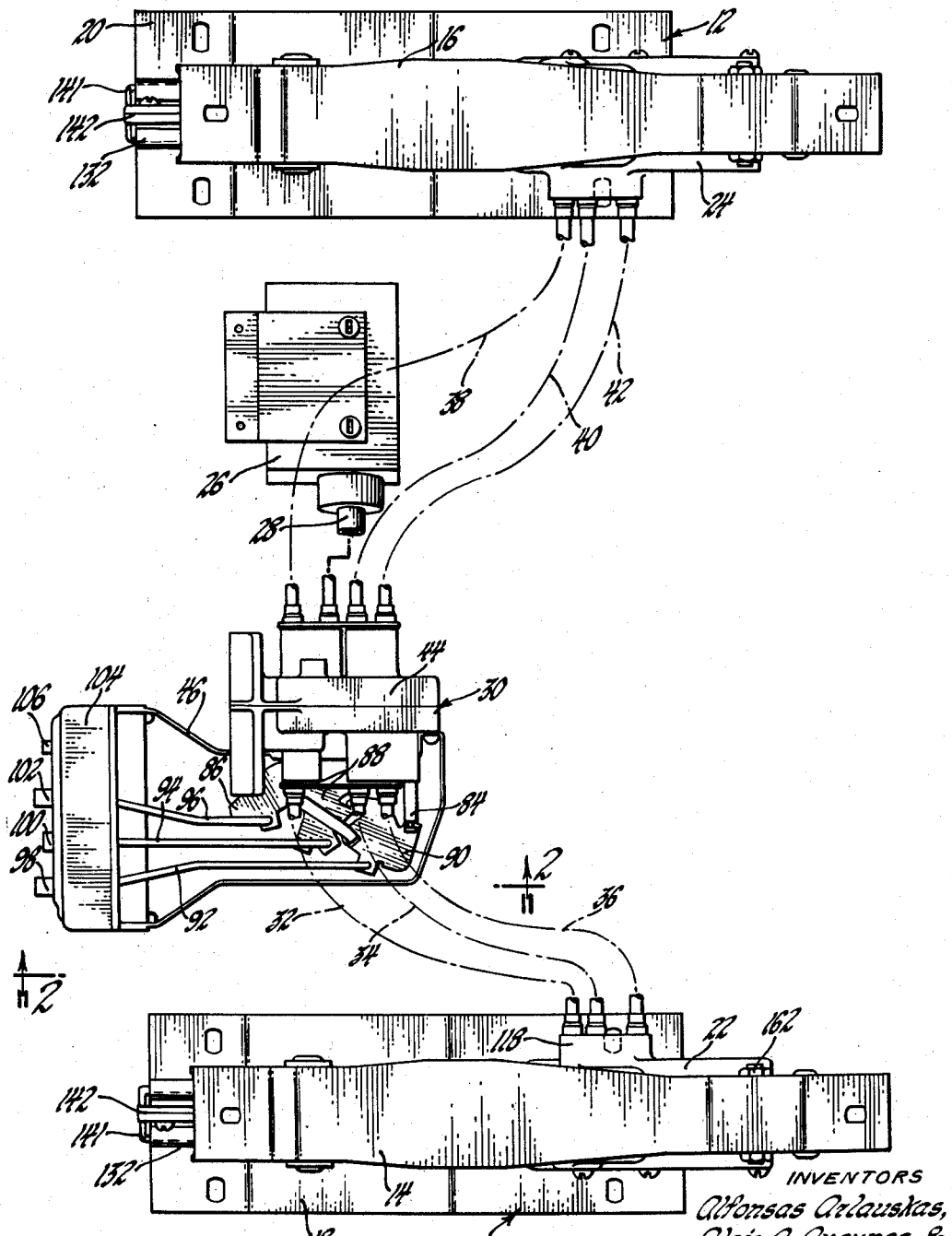

INVENTORS
Alfonsas Arlauskas,
Algis G. Augunas, &
Thomas E. Lohr
BY C. P. Barnard
ATTORNEY INVENTORS
Alfonsas Arlauskas,
Algis G. Augunas, &
Thomas E. Lohr
BY
L. P. Bernard
ATTORNEY

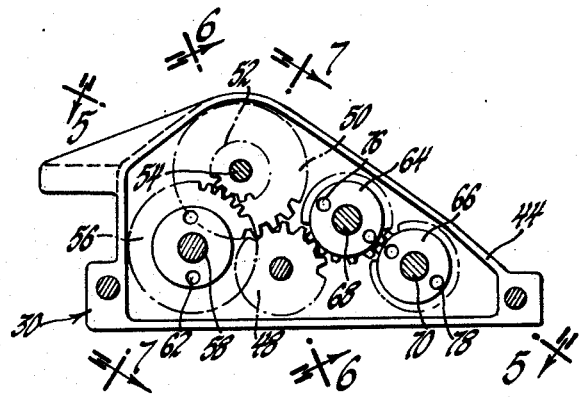

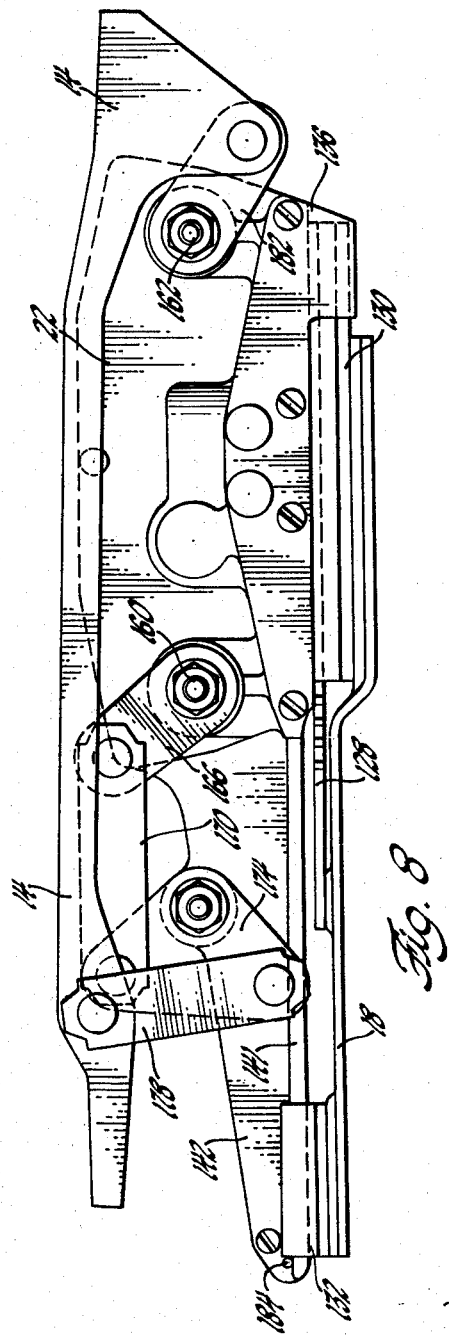
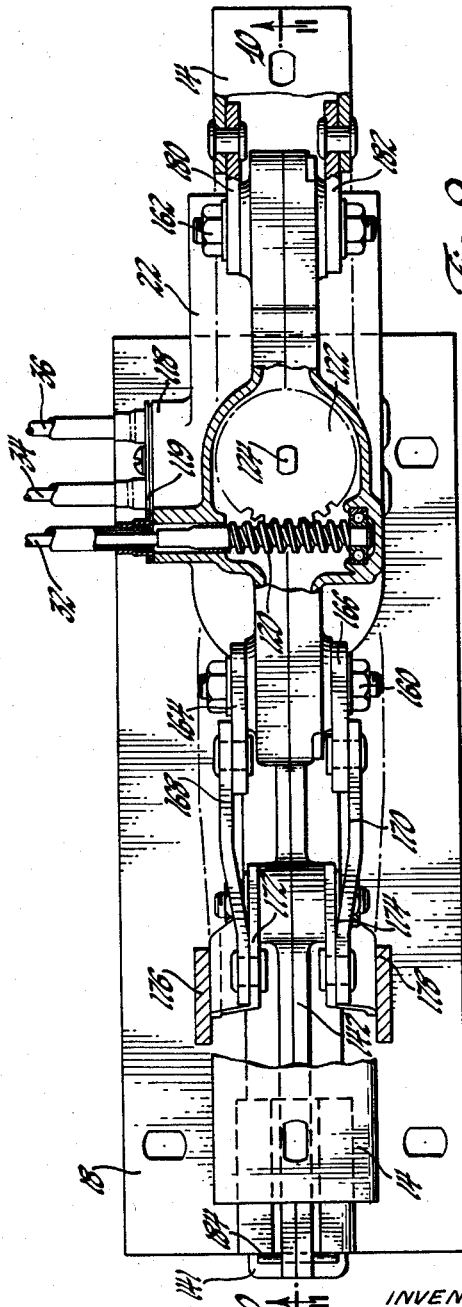
INVENTORS
Alfonsas Arlauskas,
Algis G. Augunas, &
Thomas E. Lohr
BY
C. P. Barnard
ATTORNEY

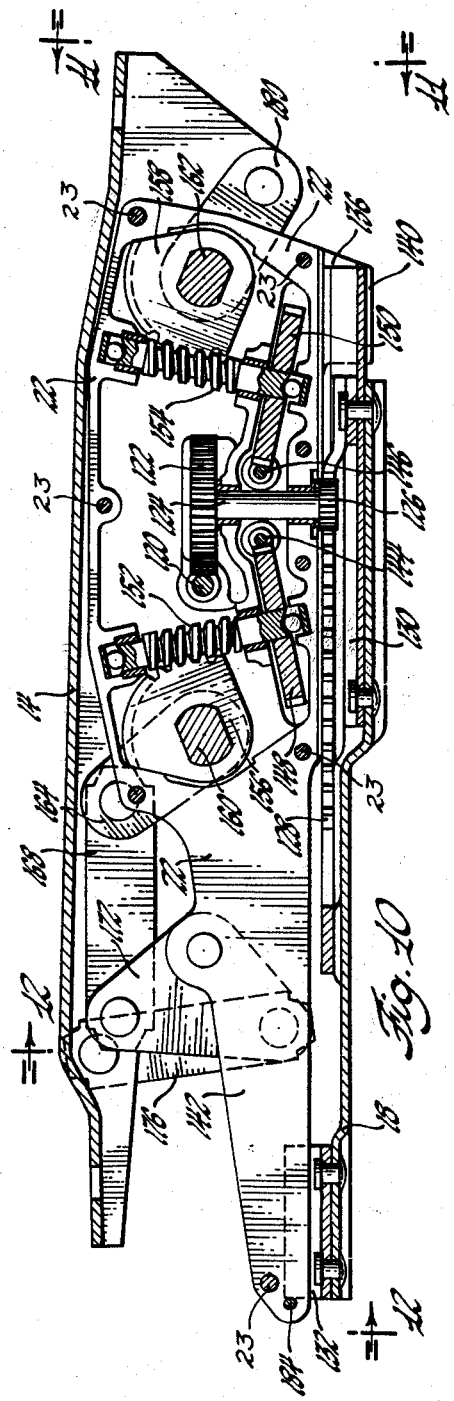

United States Patent Office 3,081,973
Patented Mar. 19, 1963

3,081,973
SIX-WAY SEAT ADJUSTER
Alfonsas Arlauskas, Livonia, and Algis G. Augunas and Thomas E. Lohr, Detroit, Mich., assignors to General Motors Corporation, Detroit, Mich., a corporation of Delaware
Filed Mar. 9, 1960, Ser. No. 13,775
15 Claims. (Cl. 248—393)

This invention relates generally to seat adjuster mechanism and more particularly to a power operated mechanism for adjustably positioning a movable seat in an automotive vehicle. In detail, the invention relates to an improved actuating mechanism having a source of power supply, such as an electric motor, that may be selectively operated to move a seat frame for adjustment upwardly or downwardly as a unit or selectively upwardly or downwardly at the front or rear of the seat as well as forwardly and rearwardly. Mechanical means are provided to control driving connections between the motor and the seat adjuster mechanism to selectively adjust the seat.

According to the general principles of the present invention, an adjustable seat is mounted on the floor pan of an automotive vehicle and is provided with a seat frame having power operable adjusting units located centrally thereof in a unitary housing that provides an integral track member at its lower surface. All of the actuating mechanism is confined within the housing so that the only mechanism without the housing is the linkage for vertical and horizontal adjustment of the seat frame. Power is transmitted from a reversible electric motor through special clutching mechanism which provides simple mechanical selectivity of six-way adjustment.

Flexible cables transmit power to the adjusting mechanism through compact adjusting mechanism power take-offs that are clustered within the adjusting housing about vertically rotating shafts having overlapping gear paths. The interior of the assembled adjuster mechanism housing is completely sealed by provision of link actuating pivotal shafts that are rotatably supported within the housing and extend outwardly therefrom in sealing relation thereto.

It is an object of the present invention to provide improved seat adjusting mechanism for positioning a movable seat selectively between forward and rearward positions and between upper and lower positions at the front and/or rear of the seat support by selectively actuable linkage. Another object of the present invention is to provide an improved electrically operated seat adjusting mechanism. A further object of the present invention is to provide electrically operated seat adjusting mechanism having an improved mechanically operable clutching mechanism. Another object of the present invention is to provide a seat adjusting mechanism which permits universal adjustment but which does not require a complicated control system necessitating the use of solenoid switches and the like. Still another object of the present invention is to provide an electric seat adjusting mechanism which will adjust the movable seat between extreme positions and which includes a source of power supply utilizing flexible cable connections. A further object of this invention is to provide a power actuated seat mechanism which may be adjusted upwardly and downwardly as a unit or elevated alternately by individual linkage at the front and rear of the seat mechanism. Another object of this invention is to provide seat adjuster mechanism contained within a unitary housing carried beneath seat support members. A further object of this invention is to provide seat adjusting mechanism contained within a unitary housing having trackways integrally formed thereon. Still another object of this invention is to provide seat adjuster mechanism having a unitary housing and containing therein all of the power transferring linkage.

Figure 2:
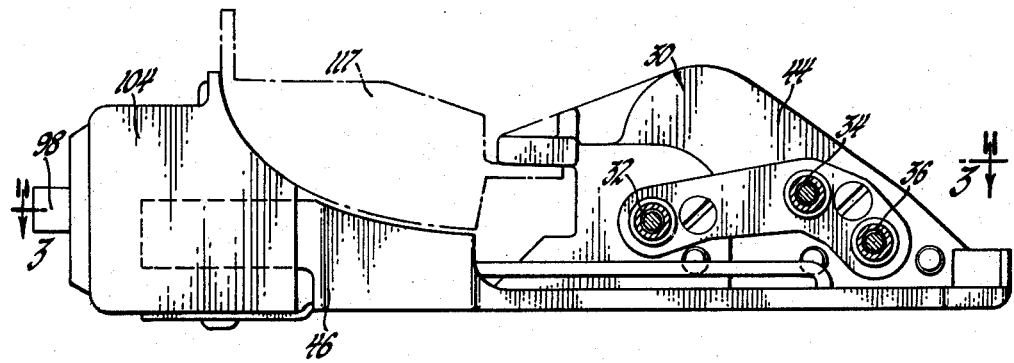
Figure 3:
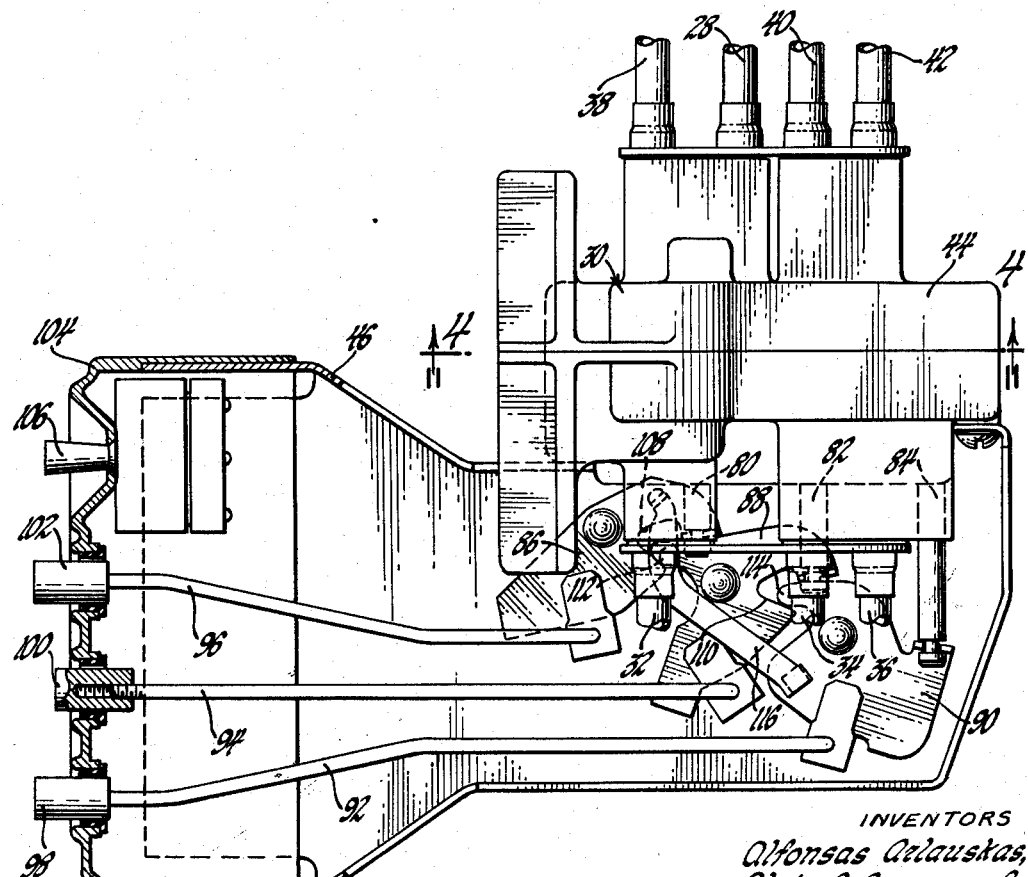

Other features, advantages and additional objects of the present invention will become apparent by reference to the following detailed description and to the accompanying sheets of drawings in which a preferred structural embodiment incorporating the principles of the present invention is shown by way of illustrative example and wherein:

FIGURE 1 is a plan view of the preferred embodiment;
FIGURE 2 is a side elevation, partly in section, of the clutch control of the preferred embodiment;
FIGURE 3 is a sectional view taken along the line 3—3 in FIGURE 2;
FIGURE 4 is a sectional view taken along the line 4—4 in FIGURE 3;
FIGURE 5 is a sectional view taken along the line 5—5 in FIGURE 4;
FIGURE 6 is a sectional view taken along the line 6—6 in FIGURE 4;
FIGURE 7 is a sectional view taken along the line 7—7 in FIGURE 4;
FIGURE 8 is a side elevational view of the seat adjuster unit of the preferred embodiment;
FIGURE 9 is a top view, partly in section, of the apparatus shown in FIGURE 8;
FIGURE 10 is a sectional view taken along the line 10—10 in FIGURE 9;
FIGURE 11 is an end view taken along the line 11—11 in FIGURE 10; and
FIGURE 12 is a sectional view taken along the line 12—12 in FIGURE 10.

Referring now to FIGURE 1, right and left-hand seat adjuster assemblies 10, 12 are shown comprising seat support channel members 14, 16, floor flanges 18, 20 and adjusting mechanism housings 22, 24 supported therebetween. The adjusting mechanism housings are to be distinguished from conventional seat adjuster structure wherein channel shaped members are utilized in place of the presently disclosed adjuster mechanism housings. The conventional channel members are generally arranged for cooperation with another channel member to provide fore and aft seat adjustment and have various linkage arrangements pivoted thereto for vertical adjustment of a seat support member. The actuating mechanism for obtaining horizontal and vertical displacement is generally separately mounted and carried on top of the channel member or at the side of the adjuster unit. Conventional seat adjusters comprise racks, gears, and other actuating mechanism which are supported adjacent to or on the seat adjuster unit without enclosure in a common housing as hereinafter disclosed. An electric motor 26 is supported centrally of the adjuster assemblies and is provided with a power output cable 28 extending to a transmission mechanism 30. Flexible power transfer cables 32, 34, 36 lead from the transmission 30 to the left-hand assembly 10, and flexible power transferring cables 38, 40, 42 lead from the other side of the transmission 26 to the right-hand adjuster assembly 12.

The transmission mechanism 30 is shown in detail in FIGURES 2-7 and comprises a gear housing 44 and a clutch control linkage housing 46. The power cable 28 is connected within a portion of the gear housing 44 to a drive gear 48 that drivingly engages step gears 50, 52 supported on an idler shaft 54 as shown in FIGURE 6. The gear 52 is drivingly engaged with a power input gear 56 that is clutchable to a shaft 58 by clutch mechanism comprising a male member 60 and a female member 62 as detailed in FIGURE 7. The shaft 58 is drivingly connected at its ends to the flexible cables 32, 38. As shown in FIGURE 4, the drive pinion 48 is also in engagement with a gear 64 which in turn drivingly engages a gear 66. The gears 64, 66 are clutchably mounted on shafts 68, 70 by male clutch members 72, 74 splined or otherwise fastened to the shafts 68, 70 and female clutch members 76, 78 associated with the gears 64, 66 as illustrated in FIGURE 5. The ends of the shafts 68, 70 drivingly engage flexible shaft members 34, 40 and 36, 42.

Referring now to FIGURE 3, the clutch actuating mechanism comprises clutch actuating push rods 80, 82, 84 that are connected through pivotally supported rocker arm links 86, 88, 90 to plunger control rods 92, 94, 96 threadedly connected to push buttons 98, 100, 102 mounted in the cover plate 104. In addition, a power control switch 106 is mounted adjacent the push buttons and controls the electric motor 26. The clutch control mechanism is provided with blocking mechanism to positively prevent actuation of any of the clutches except the one whose associated linkage is operated and comprises a cam surface 108 on the pivotal link 86, a cam surface 110 on the pivotal link 88, a cam follower 112 on the pivotal link 88, a cam follower 114 on the pivotal link 90 and a control link 116 that interconnects the pivotal link 86 and the pivotal link 90. As illustrated in FIGURE 2, the clutch housing 46 is fixed to a support bracket 117 and extends upwardly adjacent the seat for convenient operation by the seat occupant.

The adjusting mechanism includes right and left-hand adjuster assemblies 10, 12 that are identical and, therefore, only the left-hand assembly 10 will be described in detail. Referring now to FIGURE 9, the flexible cables 32, 34, 36 are shown entering the housing 22 through a plurality of centrally located access openings provided in a transverse boss 118 which is provided with a cover plate 119. The horizontal drive cable 32 is connected to a drive worm 120 that drivingly engages a worm gear 122 rotatably connected to a vertical shaft 124 that extends downwardly through the unitary housing 22 and drivingly connects a pinion 126. The pinion 126 drivingly engages a rack 128 secured to the floor flange 18 and extending longitudinally beneath the housing 22, as shown in FIGURE 10. A horizontal trackway is provided by a C-shaped channel segment 130 that is riveted or otherwise secured to the floor flange 18 and extends upwardly therefrom beneath the unitary housing 22. An additional track channel or bearing support 132 is similarly fixed to the floor flange 18. The housing 22 is slidably supported on the channel segments 130, 132 by guide means in the form of a groove 134 integrally formed on a rearward extension 136 of the housing 22 by inwardly curved flange portions 138, 140 that provide a trackway slidingly accommodating the channel segment 130 and by a T-shaped runner or bearing 141 formed on a forward extension 142 of the housing 22 that is slidingly accommodated within the channel segment 132. In the preferred embodiment the channel segment 132 is shown as being a coplanar extension of the trackway formed by the channel segment 130 but could be positioned in a different parallel plane as a bearing support for the front of the seat.

The front and rear vertical power input cables 34, 36 are drivingly connected to worm members 144, 146 that drive worm gears 148, 150 connected to vertically extending worm shafts 152, 154. Sector gears 156 and 158 are drivingly engaged by the vertically extending worms 152, 154 and fixedly secured to pivot shafts 160, 162 that are pivotally supported within the housing 22. The extremities of the pivot shaft 160 are drivingly associated with links 164, 166 externally of the housing 22 that are adapted to vertically adjust the front of the support channel 14 through pivotally connected horizontal extension links 168, 170, bell crank links 172, 174 and vertical positioning links 176, 178. The extremities of the pivot shaft 162 are drivingly associated with links 180, 182 externally of the housing 22 that are adapted to vertically adjust the rear of the support channel 14 through a pivotal connection between the links 180, 182 and the channel 14. The housing 22 is made of two sections that are fastened together by screws 23 after the power actuable drive mechanism has been assembled therein and the entire unit is then mounted on the track channels 130, 132. A blocking pin 184 is then fixed to the front of the housing to prevent disengagement of the track members.

In operation, power is transmitted from the reversible motor 26 through the drive cable 28 to the transmission 30 whereat the adjuster mechanisms are controllable through the mechanical clutch actuating linkage provided. Any one of the control buttons 98, 100, 102 may be depressed to clutch one of the cable drive shafts 58, 68, 70 to two corresponding power input cables 32, 38 or 34, 40 or 36, 42. Only one of the buttons is actuable at a time. The central rocker arm 88 is controllably linked to the rocker arms 86, 90 by the cam surfaces 108, 110 and the cam follower portions 112, 114 so that actuation of the rocker arm 88 causes clutch disengaging movement of the rocker arms 86, 90 and actuation of either of the rocker arms 86, 90 causes clutch disengaging movement of the rocker arm 88. The blocking link 116 serves to positively lock one of the rocker arms 86, 90 when the other one is actuated. Thus, actuation of the horizontal adjuster mechanism by depression of the button 102 and plunger 96 will rotate the rocker arm 86 counterclockwise about its pivotal connection to advance the push rod 80 and engage the clutch member 62, 60. The counterclockwise rotation of the rocker arm 86 will impart clockwise rotation to the rocker arm 90 through the blocking link 116 and, in addition, the cam surface 112 will impart clockwise rotation to the pivot arm 88 about its pivotal axis through the cam follower 112 to prevent clutch actuating depression of the push rods 82, 84. It will be noted, therefore, that counterclockwise movement of the rocker arms causes clutch actuating depression of the push rods 80, 82, 84, and clockwise movement of the rocker arms retracts the push rod and disengages the clutch mechanisms. As may be seen, the blocking mechanism is so arranged that actuating, counterclockwise movement of one of the rocker arms causes clutch disengaging, clockwise movement of the other rocker arms. The switch 106 is conveniently housed in the cover plate 104 adjacent the push buttons and controls the reversible electric motor so that the seat adjusting mechanism may be moved in opposite directions at the touch of the operator.

The drive cables are centrally clustered on and extend into the adjuster housing 22 through the central boss 118. The central boss of the adjuster mechanism provides a convenient central opening for the cable extensions and eliminates the inherent problems of widely spaced driving mechanism which requires a far larger portion of the limited space between the seat and the floor pan. Actuation of the control button 102 will operate the drive cable 32, the worm 120, the worm gear 122 and the pinion 126 to drive the housing 22 forwardly or rearwardly relative to the rack 128 to horizontally adjust the seat. The housing 22 is guided at the rear by the coaction of the integral slot 134 with the channel member 130 that is fixed to the floor flange 18 and at the front by the coaction of the integral runner 141 within the channel member 132 that is also fixed to the floor flange 18. By providing a trackway that is integrally formed on the housing 22, a simpler, less complicated mechanism is provided that is more rigid than existing structures. The structure provided also permits a compact overlapping arrangement of the drive gearing while maintaining optimum spacing of the slide guide bearing portions to adequately accommodate seat loading. Actuation of the plunger 100 engages the drive cable 34 and actuates the worm 144, the worm gear 148, the worm shaft 152, the gear sector 156 and rotates the pivot shaft 160 to actuate the links 164, 166 and 168, 170 to rotate the bell crank arms 172, 174 and vertically extend the lift links 176, 178. It should be noted that the compact housing of the gear adjuster mechanism is facilitated by the special linkage arrangement which transfers the lift force from the housing to the forward end of the seat. Depression of the button 102 actuates the power cable 36, the worm 146, the worm gear 150, the worm shaft 154 and the sector gear 158 to rotate the pivot shaft 162 and actuate the links 180, 182 to vertically position the rear of the seat. It should be noted that a similar actuation occurs in the right-hand assembly for each of the above-described adjustments. In the assembled position the drive mechanism of the seat adjuster units is substantially sealed within the housing 22 since suitable close fitting connecting means are provided between the pinion drive shaft 124, the pivot shafts 160, 162, the power cables 32, 34, 36 and the corresponding access holes provided in the housing 22 to prevent the entry of foreign matter into the drive mechanism compartment within the housing 22.

Since the illustrative embodiment is adaptable to various modifications without exceeding the spirit of the invention, the scope of this patent is intended to include all such modifications as reasonably and properly come within the terms of our invention as defined by the appended claims.

We claim:

1. Seat adjuster mechanism comprising a power source, drive mechanism to vertically and horizontally position a seat, power transfer means interconnecting said power source and said drive mechanism, a sealed housing member forming a completely enclosed drive mechanism containing compartment, a seat supporting channel member, pivotal linkage connected to said drive mechanism and supporting said seat supporting channel member for vertical adjustment thereof, a floor engaging support bracket, track means provided on said bracket and slidably supporting said housing member, and horizontal adjustment means connected to said drive mechanism for horizontal adjustment of said seat supporting channel by sliding movement of said housing member on said track means.

2. The apparatus as defined in claim 1 wherein said sealed housing member comprises a drive mechanism compartment having a transverse access portion centrally positioned relative to said compartment, a support boss extending outwardly from said access portion, said power transfer means extending through said access portion to connect with said drive mechanism in said compartment and being supported by said boss, and a cover plate fixed to said boss and enclosing said access portion.

3. The apparatus as defined in claim 2 wherein said sealed housing member further comprises an integral support flange extending forwardly of said compartment, front guide means integrally formed on said flange and slidably engaged with said track means, and rear guide means integrally formed on the rear of said housing and being slidably engaged with said track means.

4. Seat adjuster mechanism comprising spaced adjuster units operatively associated with a power source for movably supporting a seat member, each unit comprising a floor flange fixable to a floor surface, a front track channel fixed to one end of said floor flange, a rear track channel fixed to the other end of said floor flange, a rack member fixed to said floor flange intermediate of said front track channel and said rear track channel; a housing member, an integral front track portion provided on one end of said housing and cooperably supported by said front track channel, an integral rear track portion provided on the other end of said housing and cooperably supported by said rear track channel, the front track portion and the rear track portion being of different configuration to provide for cooperating engagement of one portion within one of said track channels and for cooperating engagement of the other portion around the other of said track channels, a drive mechanism compartment formed within said housing and located intermediate said front track portion and said rear track portion; a pinion drive shaft vertically mounted in said housing and extending downwardly therethrough, a pinion fixed to said pinion drive shaft and drivingly engaged with said rack, a pinion worm gear drivingly associated with said pinion drive shaft within said housing, a pinion worm drivingly associated with said pinion worm gear within said housing, pinion power transfer means interconnecting said pinion worm gear and said power source within said housing and extending outwardly through a transverse access opening in said housing to reversely drive said pinion and horizontally position said seat; a seat supporting member, front pivotal linkage and rear pivotal linkage interconnecting said seat supporting member and said housing, a front drive shaft and a rear drive shaft rotatably supported within said housing, the extremities of said shafts extending outwardly of said housing, means rigidly drivingly connecting said extremities of said front drive shaft with said front pivotal linkage and means rigidly drivingly connecting said extremities of said rear drive shaft with said rear pivotal linkage; individual drive mechanism for said front drive shaft and said rear drive shaft to reversely rotate each drive shaft within said housing, each drive mechanism comprising, a sector gear drivingly associated with said drive shaft within said housing, a drive shaft worm gear rotatably supported within said housing, part of said drive shaft worm gear being vertically aligned with said pinion worm gear, a drive shaft worm drivingly associated with said part of said drive shaft worm gear, and vertical adjustment power transfer means interconnecting said drive shaft worm and said power source and extending outwardly through said transverse access surface to reversely rotate said drive shaft and vertically position said seat through said linkage.

5. Seat adjuster mechanism comprising spaced adjuster units for movably supporting a seat member and connected to a power actuating source through a power transmission mechanism comprising a gear housing, a power input gear rotatably supported within said gear housing, a horizontal seat adjustment power transfer gear rotatably supported in said housing, a front vertical seat adjustment power transfer gear rotatably supported in said housing, a rear vertical seat adjustment power transfer gear rotatably supported in said housing; transmission means to transfer power from each of said power transfer gears to said adjuster units; clutch mechanism interposed between each of said power transfer gears and said transmission means; clutch operating mechanism for each of said power transfer gears, comprising for each clutch mechanism, a rocker arm controllably engaged with and pivotally supported adjacent said clutch mechanism, cam means on said rocker arm adapted to engage a cam device on one of the other rocker arms to prevent simultaneous clutch actuating movement of the rocker arms, control linkage associated with said rocker arm, a control linkage housing, a portion of said housing being positioned adjacent said seat member, and a control button device mounted in said portion and connected to said control linkage to actuate said clutch mechanism.

6. Seat adjuster mechanism for a vehicle seat or the like comprising vertically spaced horizontal members and including a seat support member and a stationary support member located below said seat support member, a power source, power transfer means connected to said power source and extending to said adjuster mechanism, linkage means to effect vertical displacement of said seat support member relative to said stationary member, gear means connected between said power transfer means and said linkage means, a gear means housing member slidably mounted on one of said spaced horizontal members to effect fore and aft adjustment of said seat support member, said linkage means being pivotally mounted on said gear means housing member and connected to the other of spaced horizontal members to effect vertical adjustment of said seat support member, and said gear means housing member comprising a centrally located portion having an enclosed compartment within which all of said gear means is mounted.

7. The seat adjuster mechanism as defined in claim 6 and wherein said gear means housing member further comprises a flange portion extending longitudinally from one end of said centrally located portion, first guide means for controlling sliding movement of said gear means housing member relative to said one of said spaced horizontal members integrally formed on said flange portion, and second guide means for controlling sliding movement of said gear means housing member relative to said one of said spaced horizontal members integrally formed on the other end of said centrally located portion.

8. The seat adjuster mechanism as defined in claim 6 and wherein rack and pinion means are provided between said gear means housing member and said other of said spaced horizontal members to effect fore and aft adjustment, additional gear means connected between said power transfer means and said rack and pinion means, and all of said additional gear means being mounted within said enclosed compartment.

9. Seat adjuster mechanism as claimed in claim 6 wherein said power transfer means is comprised of: a gear housing, a power input gear rotatably supported within said gear housing, a horizontal seat adjustment power transfer gear rotatably supported in said housing, a front vertical seat adjustment power transfer gear rotatably supported in said housing, a rear vertical seat adjustment power transfer gear rotatably supported in said housing; transmission means to transfer power from each of said power transfer gears to said adjuster units; clutch mechanism interposed between each of said power transfer gears and said transmission means; clutch operating mechanism for each of said power transfer gears comprising for each clutch mechanism, rocker arm means controllably engaged with and pivotally supported adjacent said clutch mechanism, control linkage associated with said rocker arm means, a control linkage housing, a portion of said housing being positioned adjacent said seat member, and a control button device mounted in said portion and being mechanically connected to said control linkage to actuate said clutch mechanism.

10. Seat adjuster mechanism comprising spaced adjuster units and including a seat supporting member and a stationary support member, operably associated with a power source for movably supporting a seat member, each unit comprising a floor flange fixable to a floor surface, a front track member fixed to one end of said floor flange, a rear track member fixed to the other end of said floor flange, a rack member fixed to said floor flange; a housing member, an integral front track portion provided on one end of said housing and cooperably supported by said front track member, an integral rear track portion provided on the other end of said housing and cooperably supported by said rear track member, a drive mechanism compartment formed within said housing and located intermediate said front track portion and said rear track portion, linkage means pivotally interconnected between said seat supporting member and said housing member to effect vertical displacement of said seat supporting member; and drive mechanism supported within said drive mechanism compartment operably connected to said linkage means and said rack member for effecting fore and aft movement and vertical adjustment of said seat member.

11. Seat adjuster mechanism comprising spaced adjuster units operatively associated with a power source for movably supporting a seat member, each unit comprising a floor flange fixable to a floor surface, a front track member fixed to one end of said floor flange, a rear track member fixed to the other end of said floor flange, a rack member fixed to said floor flange; a housing member, an integral front track portion provided on one end of said housing and cooperably supported by said front track member, an integral rear track portion provided on the other of said housing and cooperably supported by said rear track member, a drive mechanism compartment formed within said housing and located intermediate said front track portion and said rear track portion; a pinion drive shaft veritcally mounted in said housing and extending downwardly therethrough, a pinion fixed to said pinion drive shaft and drivingly engaged with said rack, a pinion worm gear drivingly associated with said pinion drive shaft within said housing, and pinion power transfer means interconnecting said pinion worm gear and said power source within said housing to reversely drive said pinion and horizontally position said seat.

12. Seat adjuster mechanism comprising spaced adjuster units operatively associated with a power source for movably supporting a seat member, each unit comprising a floor flange fixable to a floor surface, a front track member fixed to one end of said floor flange, a rear track member fixed to the other end of said floor flange, a rack member fixed to said floor flange; a housing member, a front track portion provided on one end of said housing and cooperably supported by said front track member, a rear track portion provided on the other end of said housing and cooperably supported by said rear track member, a drive mechanism compartment formed within said housing and located intermediate said front track portion and said rear track portion; a pinion drive shaft vertically mounted in said housing and extending therethrough, a pinion fixed to said pinion drive shaft and drivingly engaged with said rack, a pinion worm gear drivingly associated with said pinion drive shaft within said housing, a pinion worm drivingly associated with said pinioin worm gear within said housing, pinion power transfer means interconnecting said pinion worm gear and said power source within said housing to reversely drive said pinion and horizontally position said seat; a seat supporting member, front pivotal linkage and rear pivotal linkage interconnecting said seat supporting member and said housing, drive mechanism for said front pivotal linkage and said rear pivotal linkage mounted within said housing, and drive mechanism power transfer means interconnecting said drive mechanism and said power source within said housing to effect vertical adjustment of said seat supporting member.

13. The seat adjuster mechanism as defined in claim 12 and wherein said drive mechanism for said front pivotal linkage and said rear pivotal linkage comprises; a front drive shaft and a rear drive shaft rotatably supported within said housing, the extremities of said shaft extending outwardly of said housing, means rigidly drivingly connecting said extremities of said front drive shaft with said front pivotal linkage and means rigidly drivingly connecting said extremities of said rear drive shaft with said rear pivotal linkage; individual drive mechanism for said front drive shaft and said rear drive shaft to reversely rotate each drive shaft within said housing, each drive mechanism comprising, a sector gear drivingly associated with said drive shaft within said housing, a drive shaft worm gear rotatably supported within said housing, part of said drive shaft worm gear being vertically aligned with said pinion worm gear, a drive shaft worm drivingly associated with said part of said drive shaft worm gear, and vertical adjustment power transfer means interconnecting said drive shaft worm and said power source to reversely rotate said drive shaft and vertically position said seat through said linkage.

14. Seat adjuster mechanism comprising a power source, drive mechanism to vertically and horizontally position a seat, power transfer means interconnecting said power source and said drive mechanism, a sealed housing member forming a completely enclosed drive mechanism containing compartment, a seat supporting channel member, pivotal linkage connected to said drive mechanism and supporting said seat supporting channel member for vertical adjustment thereof, a floor engaging support bracket, track means provided on said bracket and slidably supporting said housing member, and horizontal adjustment means connected to said drive mechanism for horizontal adjustment of said seat supporting channel by sliding movement of said housing member on said track means, said pivotal linkage comprising a rear link pivotally supporting the rear of said channel member, a rear drive shaft rotatably supported by said housing within the rear portion of said compartment and being operatively associated with said drive mechanism therein, a portion of said rear drive shaft extending outwardly from said housing and being drivingly associated with said rear link, a front drive shaft rotatably supported by said housing within the front portion of said compartment and being operatively associated with the said drive mechanism therein, front link means pivotally supporting the front of said channel member, a portion of said front drive shaft extending outwardly from said housing and being drivingly associated with said front link means.

15. Seat adjuster mechanism comprising a power source, drive mechanism to vertically and horizontally position a seat, power transfer means interconnecting said power source and said drive mechanism, a sealed housing member forming a completely enclosed drive mechanism containing compartment, a seat supporting channel member, pivotal linkage connected to said drive mechanism and supporting said seat supporting channel member for vertical adjustment thereof, a floor engaging support bracket, track means provided on said bracket and slidably supporting said housing member, and horizontal adjustment means connected to said drive mechanism for horizontal adjustment of said seat supporting channel by sliding movement of said housing member on said track means, said pivotal linkage comprising a rear link pivotally supporting the rear of said channel member, a rear drive shaft rotatably supported by said housing within the rear portion of said compartment and being operatively associated with said drive mechanism therein, a portion of said rear drive shaft extending outwardly from said housing and being drivingly associated with said rear link, a front drive shaft rotatably supported by said housing within the front portion of said compartment and being operatively associated with the said drive mechanism therein, front link means pivotally supporting the front of said channel member, a portion of said front drive shaft extending outwardly from said housing and being drivingly associated with said front link means, said housing member being provided with an integral support flange extending forwardly of said compartment and slidably supported by said track means, and said front link means comprises: a front link pivotally fixed to said channel member, a bellcrank pivotally secured to said integral support flange forwardly of said compartment and drivingly associated with said front link, and drive linkage connecting said front drive shaft and said bellcrank to vertically position the front of said channel member through said bellcrank and said front link.

References Cited in the file of this patent
UNITED STATES PATENTS

| | | |
|---|---|---|
| 2,886,094 | Pickles | May 12, 1959 |
| 2,887,898 | Jovanovich | May 26, 1959 |